J. C. WALTER.
Side-Bar Vehicle.
No. 213,477. Patented Mar. 18, 1879.
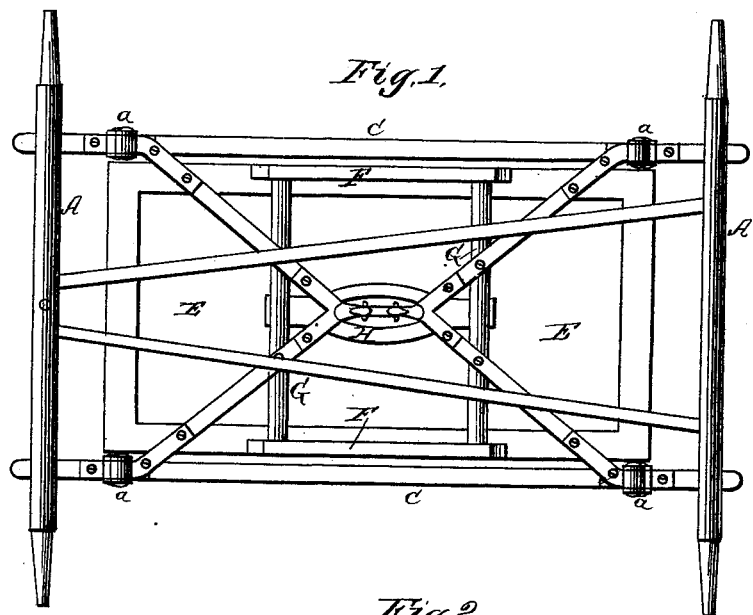
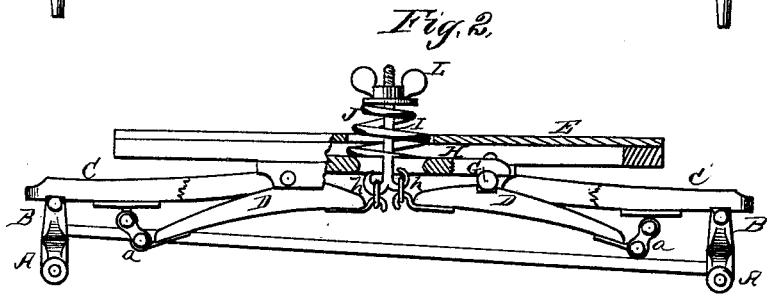
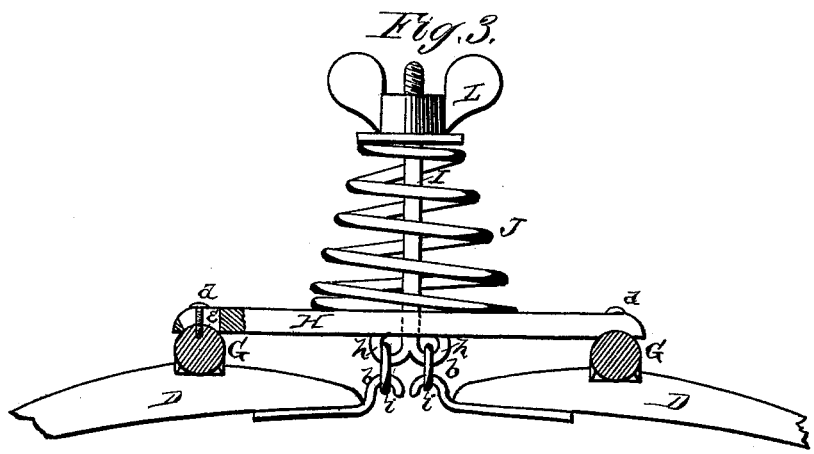
Witnesses:
N. C. McArthur
John C. Rogers
Inventor:
Jacob C. Walter
per
H. Alexander Elliott
Attorneys

UNITED STATES PATENT OFFICE.

JACOB C. WALTER, OF LEONARDSVILLE, NEW YORK.

IMPROVEMENT IN SIDE-BAR VEHICLES.

Specification forming part of Letters Patent No. 213,477, dated March 18, 1879; application filed January 27, 1879.

*To all whom it may concern:*

Be it known that I, JACOB C. WALTER, of Leonardsville, in the county of Madison and State of New York, have invented certain new and useful Improvements in Side-Bar Vehicles; and I do hereby declare that the following is a full, clear, and exact description thereof, reference being had to the accompanying drawings, and to the letters of reference marked thereon, which form part of this specification.

The nature of my invention consists in the construction and arrangement of a side-bar vehicle, as will be hereinafter more fully set forth.

In order to enable others skilled in the art to which my invention appertains to make and use the same, I will now proceed to describe its construction and operation, referring to the annexed drawings, in which—

Figure 1 is a bottom view of my invention. Fig. 2 is a side view thereof, partially in section. Fig. 3 is an enlarged detailed view of a part thereof.

A A represent the axles of the vehicle, with head-blocks B B; and C C, the side bars, secured to and connecting the ends of the head-blocks. Near each end of each side bar, C, is pivoted a link, a, to which is pivoted a bar or lever, D, as shown. The two bars or levers D D at each end of the vehicle converge, and have their inner ends firmly secured together by suitable plates, castings, or other means, and a hook, b, is fastened at this point, as shown fully in Fig. 3.

E represents the bottom of the wagon-body, provided on its under side, at each side, with a rail, F, and in the ends of these rails are placed rocking bars G G. H represents a bolster, placed in the center on top of the rocking bars G, and connected thereto by bolts d, passing through slots e in the ends of the bolster, to allow a certain rocking movement of the said bars G.

The levers D D, from each end of the vehicle, are firmly secured to the under side of the corresponding rocking bar G by bolts or otherwise.

The center of the bolster H has an oval opening for the passage of a bolt, I, the lower end of which is formed with side hooks, h h, and these hooks are, by links i i, connected with the hooks b at the inner ends of the levers D. Surrounding the bolt I is a spiral spring, J, which rests upon the bolster H, as shown.

The bolt I and spring J project upward through an opening in the wagon-body bottom E, and a thumb-nut, L, is screwed on the upper end of the bolt, for holding the spring and regulating its tension at will.

With this invention the movement of the body is steady and firm, and always parallel with the side bars, and obviates the most serious difficulty of all carriages where springs are employed.

It will be noticed that the spring is supported upon the bolster under the body, and entirely disconnected from the body.

In some cases the spring may be placed under the seat, and rest upon a cross-sill placed in the bottom of the body directly over the opening shown in the body.

By supporting the spring as shown and described, when properly applied it gives more room under the seat, the spring simply reaching up through just far enough to manipulate the thumb-nut within the body.

Having thus fully described my invention, what I claim as new, and desire to secure by Letters Patent, is—

1. The combination of the hinged levers D D at each end of the vehicle, the rocking bars G G, bolster H, spring J, and body-bottom E, substantially as and for the purposes herein set forth.

2. The combination of the levers D, bolster H, hooks b, bolt I, with hooks h and links i, spring J, and thumb-nut L, substantially as and for the purposes herein set forth.

3. The combination, with the side bars, C C, and body-bottom E, of the converging levers D, with links a and hooks b, rocking bars G, slotted bolster H, bolt I, connected to the hooks b, the spring J, and thumb-nut L, all substantially as and for the purposes herein set forth.

In testimony that I claim the foregoing as my own I affix my signature in presence of two witnesses.

JACOB C. WALTER.

Witnesses:
H. M. AYLESWORTH,
DANIEL HARDING.